US006606647B2

(12) United States Patent
Shah et al.

(10) Patent No.: US 6,606,647 B2
(45) Date of Patent: *Aug. 12, 2003

(54) SERVER AND METHOD FOR ROUTING MESSAGES TO ACHIEVE UNIFIED COMMUNICATIONS

(75) Inventors: Niraj A. Shah, Issaquah, WA (US); Ethan B. Hugg, Seattle, WA (US); Kevin L. Chestnut, Seattle, WA (US)

(73) Assignee: InfoSpace, Inc., Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,249

(22) Filed: Jan. 11, 1999

(65) Prior Publication Data

US 2003/0105821 A1 Jun. 5, 2003

(51) Int. Cl.[7] .............................................. G06F 13/00
(52) U.S. Cl. ....................................................... 709/206
(58) Field of Search ................. 709/200, 204, 709/205, 206, 207, 227, 238

(56) References Cited

U.S. PATENT DOCUMENTS 5,369,686 A    11/1994  Dutra et al.
5,742,905 A    4/1998   Pepe et al.
5,825,865 A    10/1998  Oberlander et al.

FOREIGN PATENT DOCUMENTS

EP    0 539 105 A2    4/1993
WO    WO 00/41533     7/2000

OTHER PUBLICATIONS

Eschenburg, A., "Wo Laufen Sie Denn?" ICQ Haelt Verbindung Zu Bekannten *CT Magazin Fuer Computer Technik*, No. 22, Oct. 26, 1998, pp. 92–95.

Schulzrinne, H., and J. Rosenberg, "Signaling for Internet Telephony," *Proceedings Sixth Int'l Conf. on Network Protocols*, Austin, Texas, Oct. 13–16, 1998, pp. 298–307.

*Primary Examiner*—Robert B. Harrell

(57) ABSTRACT

A server routes one's incoming messages to his/her communication devices according to his/her routing preferences, and modifies the messages as needed. For example, the server can route an incoming page to one's email account and, if necessary, modify the page so that it is compatible with the email client. Thus, the server enables a number of diverse features such as: selection of routing topology (direct or indirect), translation of network restrictions, conditioning a synchronous communication for reception by an asynchronous device, message encryption, and callback or "buddy list" services.

28 Claims, 17 Drawing Sheets

US 6,606,647 B2

SERVER AND METHOD FOR ROUTING MESSAGES TO ACHIEVE UNIFIED COMMUNICATIONS

TECHNICAL FIELD

The invention relates generally to communication networks that include computer hardware and software, and more particularly to a server, software run by the server, and a method implemented by the software for routing messages according to the message recipient's preferences.

BACKGROUND OF THE INVENTION

Today, a person may have more than one personal message device such as a wireless pager (e.g. a Skytel pager) or an e-mail client (e.g. Microsoft Outlook) that provides access to the person's e-mail account. Often, these devices communicate to other message devices via a computer network such as a local intranet or the Internet.

FIG. 1 is a block diagram of a conventional computer network 10, which allows communication between message devices. The network 10 includes a sender's computer 12s, which has an input device 13s (e.g. a keyboard or a mouse) coupled thereto and which includes a processor 14s coupled to a storage device 16s. The network 10 also includes a recipient's computer 12r, which has an input device 13r and which includes a processor 14r and a storage device 16r. For example, the storage devices 16s and 16r may include a hard drive, volatile electronic memory, or both. The computers 12s and 12r are connected to a communication path 18 by networking circuitry that is omitted for clarity. For example, the path 18 may represent the communication lines that tie into and form the Internet. The processor 14s can run messaging devices such as a desktop pager 20s, a web browser 22s (e.g. Netscape Navigator), and an e-mail client 24s, which allows the sender to send and receive e-mail messages via an e-mail server 26s. Although the processor 14s executes the software that runs these devices, it is common to state that the computer 12s runs these devices. The sender may also have a wireless pager 28s and a voicemail server 30s, which are also connected to the path 18. The voicemail server 30s may allow the sender to send and receive voice messages via the computer 12s or via a telephone system (not shown). Similarly, the recipient's computer 12r can run a desktop pager 20r, a web browser 22r, and an e-mail client 24r, which allows the recipient to view e-mail received on an e-mail server 26r. Also, the recipient may have a wireless pager 28r and a voicemail server 30r. Although the computers and message devices are labeled as sending or receiving devices for description purposes, it is understood that these labels are arbitrary such that the sending computer and message devices can be used to receive messages and the receiving computer and message devices can be used to send messages.

The system 10 may also include a file server 32, which is connected to the path 18 and which can assist with the transfer of messages between the sender's messaging devices and the recipient's messaging devices. For example, the server 32 may be a server of an internet service provider (ISP), which facilitates the transfer of messages between ISP account holders and between an account holder and a non-account holder. Or, the server 32 may be a paging company's server that transfers messages between the wireless pagers 28s and 28r.

In operation, the network 10 typically allows two topologies for transferring messages from one device to another: the point-to-point (PTP) topology, and the star topology. With the PTP topology, a message is routed directly between the sending and receiving devices. For example, using a PTP topology, the desktop pager 20s sends a message directly to the desktop pager 20r via the computer 12s, the path 18, and the computer 12r. In some applications, such as where it is an ISP server, the server 32 may open this direct path between the pagers 20s and 20r. Conversely, with a star topology, the message is routed through an intermediate node or device such as the server 32. For example, using a star topology, the pager 28s sends a message intended for the pager 28r to the server 32, which may be the paging company's server. The server 32 then processes the message and sends it to the pager 28r. This may occur for security or other reasons. Therefore, because the PTP topology eliminates the overhead of having the server receive and send the message, it is often faster and ties up fewer network resources than the star topology.

Unfortunately, if the environment of the network 10 does not allow all messages to be sent with a PTP topology, then the server 32 may be programmed to route all messages with a star topology to prevent messaging failure. This may create an unnecessary bottleneck at the server 32, thus significantly increasing access times and aggravation for users of the server 32. Alternatively, if the same type of server 32 is to be installed in a network 10 having an environment that does allow all messages to be sent with a PTP topology, then the server software will have to be modified to allow this. Thus, if the server 32 can be used in both network environments, then the server manufacturer will have to develop and offer two respective software packages, one for PTP and another for star. Furthermore, the customer will have to install new software if the network environment changes, or if he wishes to install the server 32 in another network 10 having a different environment.

Furthermore, a recipient is often unable to retrieve messages from some of his message devices for extended periods of time, and if a message device is unavailable to receive a message, the message may be lost. For example, suppose the sender sends an e-mail message from his e-mail client 24s to the recipient's e-mail server 26r. If the recipient is out of town and has no access to the server 26r other than through the e-mail client 24r, then he must wait until he returns before he learns of and can read the sender's e-mail message. Alternatively, if the sender sends a desktop page from his pager 20s and the recipient's desktop pager 20r is not running, then the message has nowhere to go and may be lost.

Additionally, a message transfer may be unsuccessful if the sending device is of a different type than the receiving device. For example, if the recipient's e-mail client 24r is Microsoft Outlook, it may be unable to read an e-mail message from e-mail clients other than those sold by Microsoft.

Moreover, in applications where the server 32 is common to the sending and receiving devices, such as when it is an ISP server, the server 32 may use polling to allow a sender to determine if an intended recipient's message device is available to receive a message. For example, if the sender wants to send a desktop page, he may first want to determine if the intended recipient's computer is logged onto the server 32, and thus if the recipient is "online" and able to receive the page. To make this determination, the sender requests, via his computer 12s, the server 32 to poll all of the computers that are logged onto the server 32 and to notify the sender if one of these computer's is the recipient's computer 12r. Unfortunately, because the server 32 must communicate with each logged on computer, such polling requires a significant amount of processing time, and thus can significantly increase user access times, particularly during hours of peak use. For example, it is common during peak hours for the number of logged-on computers to exceed one million! Furthermore, if the computer 12r is not logged onto the server 32 at the time that it performs the polling, then the only way for the sender to determine if the computer 12r subsequently logs on is to subsequently request the server 32 to repeat the polling. Thus, this significantly burdens the sender, because he may have to request several polls before he either gives up or the computer 12r logs onto the server 32.

SUMMARY OF THE INVENTION

In one aspect of the invention, a server is provided for facilitating communication between a sending device and a receiving device. The server includes a storage device for storing a program, and a processor for executing the program and having first and second states. The processor allows the sending device to send a message past the processor to the receiving device if the processor is in the first state, and the processor receives the message from the sending device and sends the message to the receiving device if the processor is in the second state.

Thus, such a server can automatically select and implement the best network routing topology, star or PTP, on a message-by-message basis. In one embodiment, the server selects and implements the PTP topology unless it cannot be implemented, in which case the server selects and implements the star topology.

DETAILED DESCRIPTION OF THE INVENTION

Figure 1:
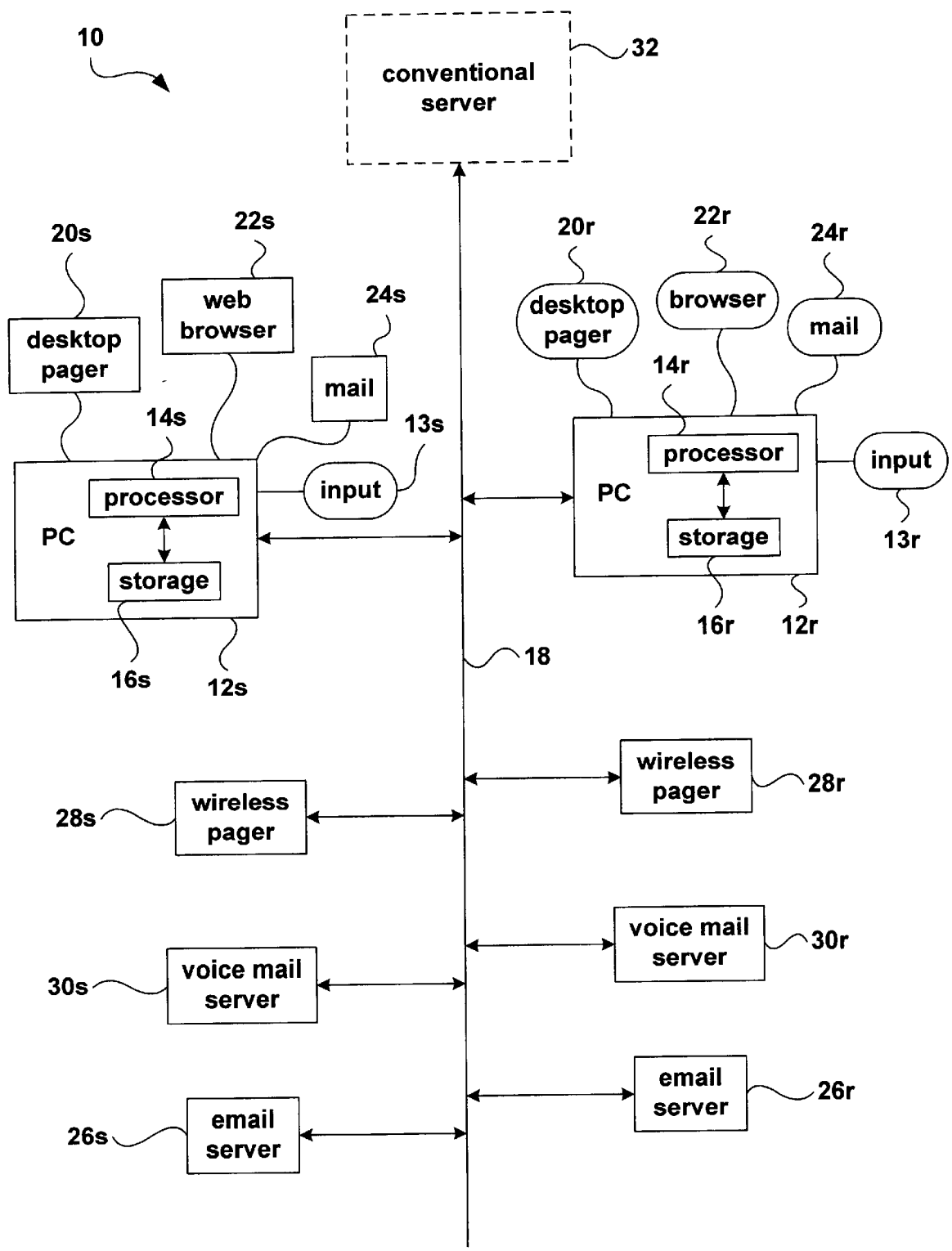
FIG. 1 is a block diagram of a communications network according to the prior art.
Figure 2:
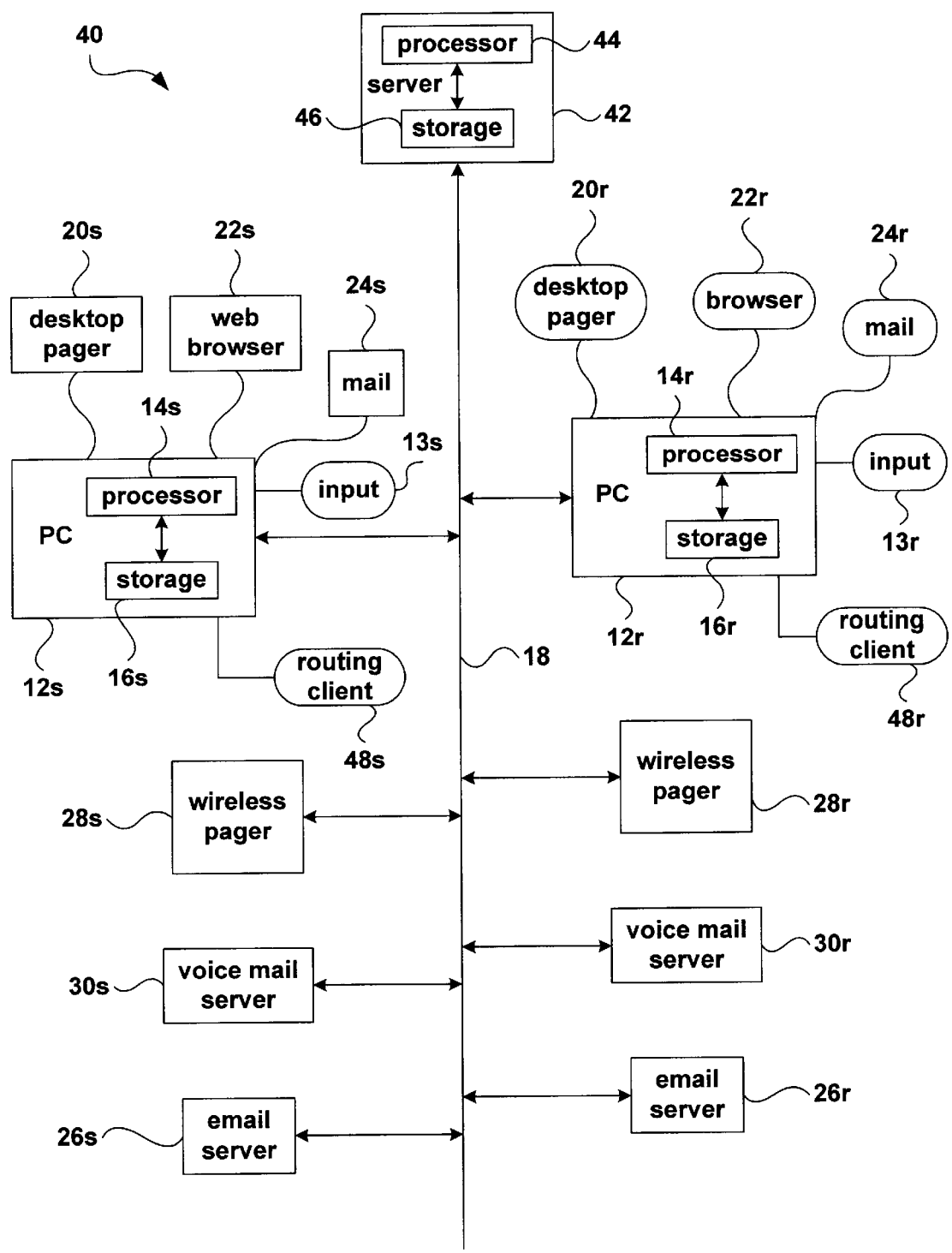
FIG. 2 is a block diagram of one embodiment of a communications network according to the invention.

FIG. 2 is a block diagram of an embodiment of a communication network 40 according to the invention, where elements that are common to FIG. 1 have the same reference numerals. The network 40 includes a routing server 42, which includes a conventional processor 44 and a conventional storage device 46. In one embodiment, the device 46 includes a volatile memory such as dynamic random access memory (DRAM), a non-volatile memory such as a hard disk, or a combination of both volatile and nonvolatile memory. The processor 14r of the computer 12r runs a routing client 48r, which, as discussed below, works with the server 42 to route the recipient's messages according to the recipient's message routing preferences. The processor 14s of the sender's computer 12s may also run a routing client 48s, which in one embodiment is the same as the routing client 48r. In one embodiment, the server 42 runs My Agent server software from Active Voice Corporation, and the clients 48s and 48r are My Agent software clients from Active Voice.

Still referring to FIG. 2, and as discussed in more detail below in conjunction with FIGS. 4–19, the general operation of the network 40 is discussed according to one embodiment of the invention.

In operation, the server 42 routes the recipient's incoming messages to the recipient's message device specified by the recipient's routing preferences. For example, the routing preferences may specify that the server 42 route all messages directed to the desktop pager 20r to the e-mail server 26r.

To allow the server 42 to perform such rerouting, the recipient gives the sender access to one or more of the recipient's message devices via the server 42. In one embodiment, this access is through the sender's routing client 48s, the recipient's web page set up on the server 42, or the recipient's address with respect to the server 42.

The server 42 automatically determines the best network topology for routing a message from the sending device to the receiving device specified by the recipient's routing rules based on criteria including the sender's identity, the identity of the recipient's message device to which the sender has directed the message, the priority of the message (e.g., urgent, normal, or low), the receiver's availability, and the size of the message. In one embodiment, the server 42 routes the message using a PTP topology unless this topology is unavailable with respect to the message.

In one embodiment, if the format, such as the protocol, size, or encryption, of the sent message is incompatible with the receiving device specified by the recipient's routing preferences, then the server 42 reformats the message before sending it to the receiving device. Thus, the server 42 allows one type of message device, such as the web browser 22s, to send a message to another type of message device, such as a desktop pager 20r.

In another embodiment, the server 42 eliminates the problems with conventional polling by maintaining a list of the users that are currently logged onto the server 42. This allows a user to request a "callback" from the server 42 when another user logs onto the server 42.

In yet another embodiment, the client 48r monitors the recipient's patterns with respect to his received messages, and based on these patterns, automatically suggests, develops, or maintains the routing preferences that best fit the recipient's lifestyle.

In still another embodiment, the server 42 allows a user to have multiple computers 12r simultaneously logged onto the server 42, where each computer 12r is running a respective routing client 48r. For example, it is common for a user to have a work computer and a home computer. Thus, the server 42 allows both of these computers to be simultaneously logged on and running respective routing clients 48r. To prevent conflicts if the clients 48r have different routing preferences, the clients 48r determine which of them is the primary client whose routing rules the server 42 will follow.

Figure 3:
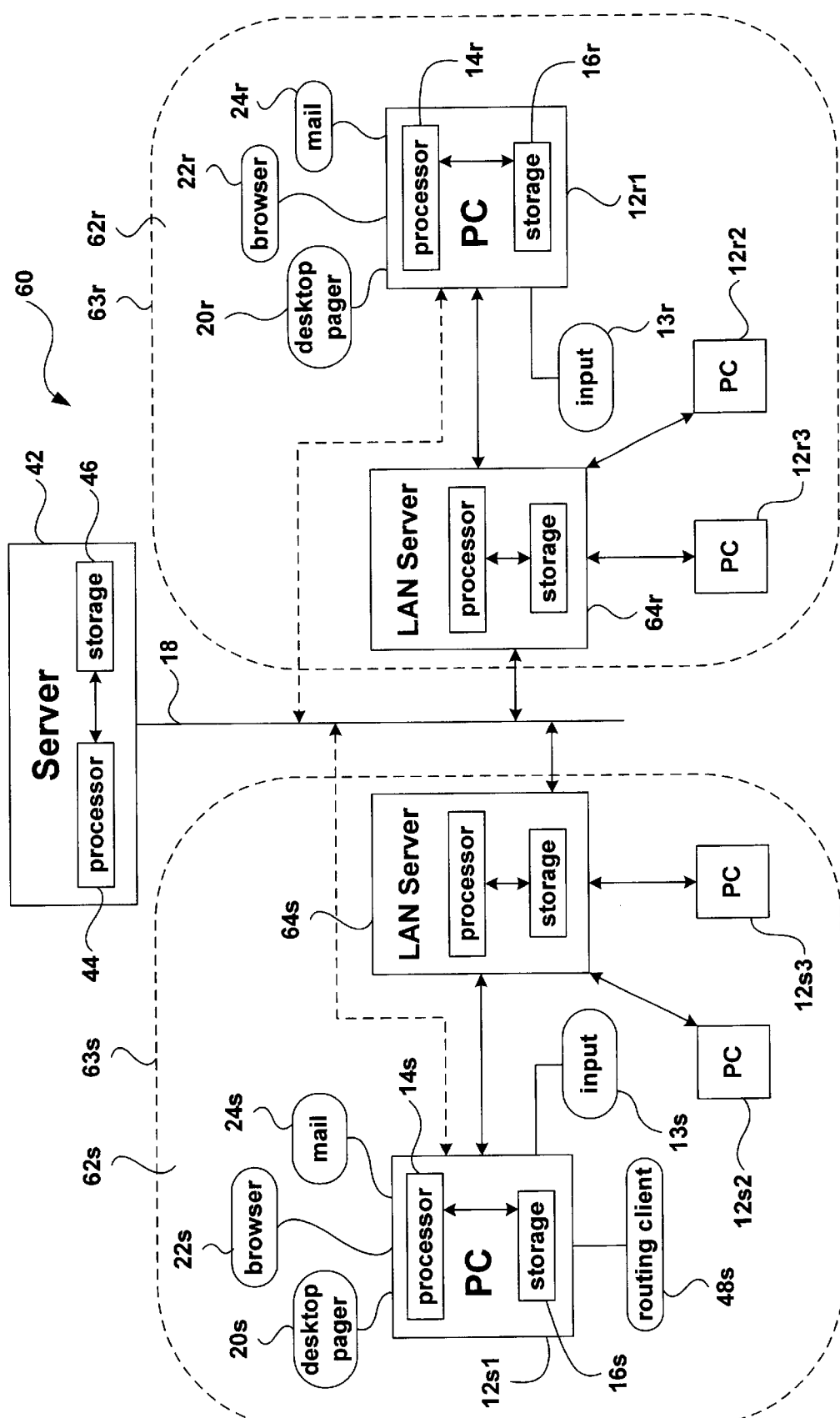
FIG. 3 is a block diagram of another embodiment of a communications network according to the invention.

FIG. 3 is a block diagram of a communications network 60 according to another embodiment of the invention, where like elements have like reference numerals with respect to FIGS. 1 and 2. In the network 60, the computers 12s1 and 12r1 are part of local area networks 62s and 62r, respectively. Each of the networks 62s and 62r is protected by a respective conventional firewall, represented by the dashed lines 63s and 63r, respectively, and includes a respective server 64s and 64r. In one embodiment, the communication path 18 represents the Internet, the computer 12s and the server 64s communicate with each other over an intranet, and the computer 12r and the server 64r communicate with each other over another intranet. Furthermore, each of the networks 62s and 62r is similar to the network 40 of FIG. 2, where the servers 64s and 64r each correspond to the server 42 of FIG. 2. Thus, in this embodiment, the server 64s routes messages between the message devices of the network 62s in a manner similar to that described for the server 42 of FIG. 2. Likewise, the server 64r routes messages between the message devices of the network 63r in a similar manner.

Still referring to FIG. 3, despite the firewalls 63s and 63r, the server 42 allows a sending device in the network 62s to send a message to a receiving device in the network 62r and routes the message according to the recipient's routing rules. Typically, the firewalls 63s and 63r prevent the server 42 from implementing a PTP topology for such a message. But because the server 42 can automatically select the proper topology, the same server 42 that is used in the network 40 of FIG. 2 can also be used in the network 60. That is, neither the server hardware nor server software need be modified, so manufacturing and installation expenses are reduced compared to prior-art communication servers.

Figure 4:
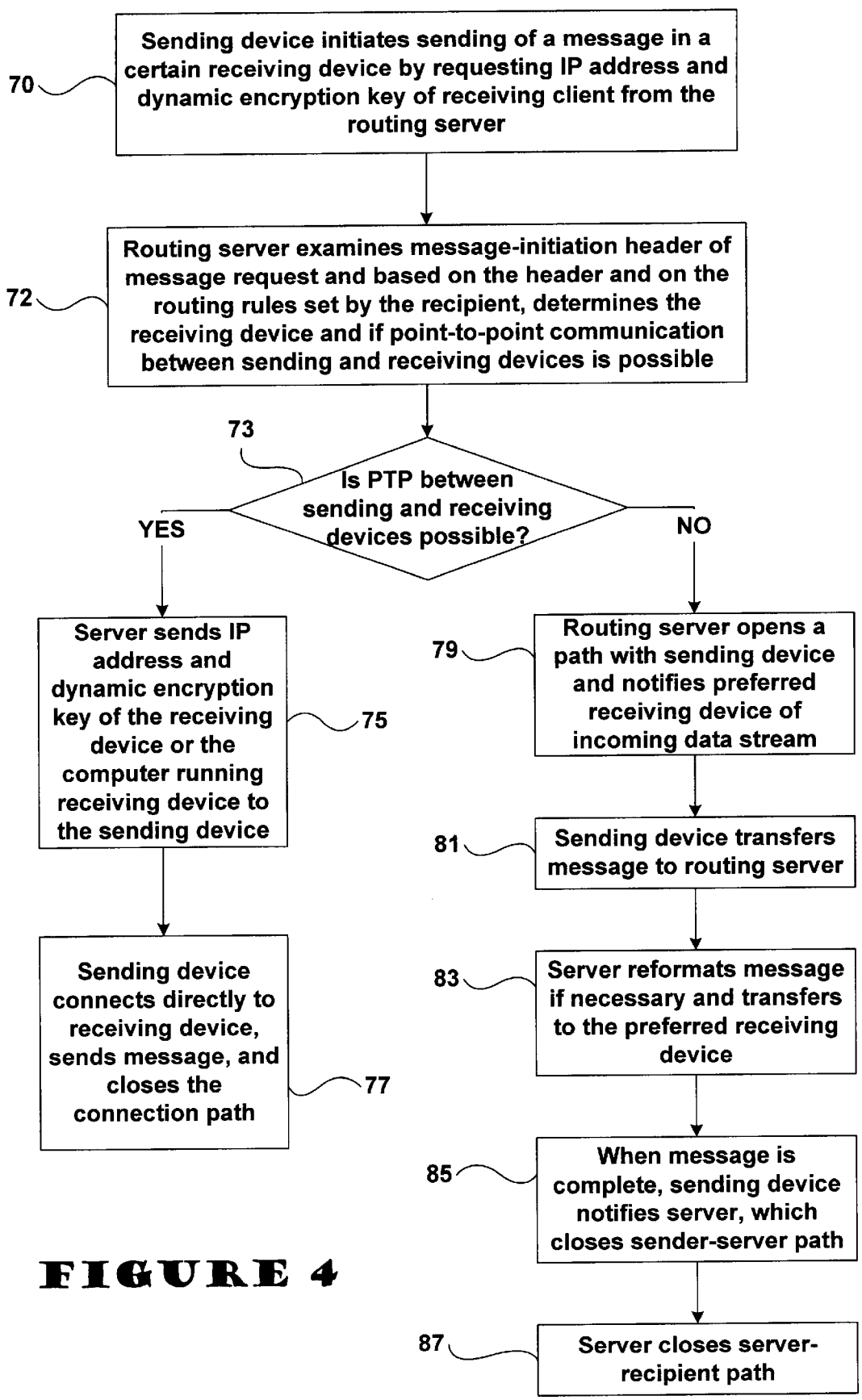
FIG. 4 is a flow chart of one embodiment of a procedure that the routing servers of FIGS. 2 and 3 implement to automatically set the network routing topology for transmission of a message.

FIG. 4 is a flow chart that details one embodiment of the general topology selection and message routing procedure used by the networks 40 and 60 of FIGS. 2 and 3, respectively. For clarity, reference will be made to the elements of FIG. 2 unless otherwise specified.

Referring to step 70, the sending device, for example the desktop pager 20s, initiates the sending of a message to a receiving device by sending a conventional message-initiation header to and requesting the IP address and dynamic encryption key of the receiving device (or of the computer, such as the computer 12s, running the device) from the routing server 42 via the path 18. With respect to the network 60 of FIG. 3, however, the pager 20s typically sends this information to the path 18 via the server 64s. The message-initiation header typically includes information such as the identities of the sender and recipient and the length and priority of the message. Furthermore, in one embodiment, the server 42 determines the identities of the sending and intended receiving devices from the format of the message header. For example, a header from the desktop pager 20s often has a different number of bytes or is otherwise different than a header from the web browser 22s.

Next, referring to steps 72 and 73, the server 42 examines the message-initiation header and, based on the header, the network environment, and the recipient's routing rules, determines the appropriate receiving device and whether or not PTP communication between the sending and receiving devices is possible.

For example, suppose the sender desires to send a message from his desktop pager 20s to the recipient's desktop pager 20r. Furthermore, suppose that the recipient's routing rules indicate that the desktop pager 20r is to receive this message. If the server 42 determines that there are no firewalls or other network environment conditions that prevent a PTP topology, it implements a PTP topology.

Alternatively, suppose the sender desires to send a message from his e-mail client 24s to the recipient's e-mail account on the e-mail server 26r, and that the recipient's routing rules instruct the server 42 to route all messages directed to the e-mail server 26r to the desktop pager 20r. If the format of the message from the e-mail client 24s in incompatible with the desktop pager 20r, then the server 42 determines that a star topology is appropriate so that the server 42 can receive and reformat the message from the e-mail client 24s and then send the reformatted message to the desktop pager 20r. For example, desktop pagers such as the desktop pager 20r often limit the size of a received message to 100–200 bytes. Therefore, if the message from the e-mail client 24s is longer than this, the server 42 will decide on a star topology so that it can receive and truncate the message before sending it to the desktop pager 20r.

Or, if the message is so large or has so many recipients that a PTP topology would be unable to efficiently handle the message, the server 42 may implement the star topology. For example, suppose the sender wishes to send an e-mail message having a one-megabyte attachment to ten recipients, and that all of the recipients' routing rules indicate that the server 42 is to route such an e-mail message to their respective e-mail servers 26r. In one embodiment, because of the file length and the relatively large number of recipients, the server 42 determines that multicasting is more efficient than setting up direct PTP paths between the sender's e-mail server 26s and the respective e-mail servers 26r. Therefore, the server 42 implements a star topology by instructing the e-mail server 26s to send the message to the server 42 only once, and then sending the received message to each of the e-mail servers 26r of the respective recipients. Alternatively, the server 42 may forward the message to a conventional multicasting server (not shown), which sends the message to each of the e-mail servers 26r.

Moreover, the server 42 may allow the sending device, such as the desktop pager 20s, to first try to send a message with a PTP topology, and if this attempt fails, the server 42 instructs the sending device to retry with a star topology.

Referring to FIG. 3, the server 42 may implement variations of the star topology in the network 60 if one or both of the firewalls 63s and 63r prevent the server 42 from opening a PTP path between a message device of the network 62s and a message device of the network 62r. In one embodiment, after determining that it cannot implement a PTP topology, the server 42 first tries to implement a version of the star topology in which the server 42 bypasses the servers 64s and 64r and communicates directly with the sending and receiving devices. This is significantly faster and causes less traffic on the networks 62s and 62r than if the message were routed through the servers 64s and 64r. For example, if the desktop pagers 20s and 20r are the sending and receiving devices respectively, then the server 42 receives the message from the pager 20s and sends it to the pager 20r in a manner similar to that described above with respect to a star topology in the network 40 of FIG. 2. If the server 42 cannot implement this version of the star topology, then, as a last resort, the server 42 routes the message through one or both of the servers 64s and 64r.

Next, referring to step 75, if a PTP topology is possible, then the server 42 sends the IP address and the dynamic encryption key of the receiving device specified by the routing preferences (or of the computer 12r if it is running the receiving device) to the sending device.

Then, referring to step 77, the sending device sends the message directly to the receiving device—thus bypassing the server 42, and with respect to the network 60 of FIG. 3, bypassing the servers 64s and 64r—and, after it sends the message, conventionally closes the direct PTP communication path over which the sending device sent the message.

Alternatively, referring to step 79, if the server 42 cannot implement a PTP topology, the server 42 implements a star topology. Specifically, the server 42 opens a communication path between itself and the sending device and notifies the receiving device specified by the recipient's routing rules of the incoming data steam that forms the message. For example, as discussed above, if the e-mail client 24s is the sending device and the desktop pager 20r is the receiving device, then the server 42 opens a path between the e-mail client 24s and itself via the e-mail server 26s, and notifies the desktop pager 20r that a message is forthcoming.

Next, referring to step 81, the sending device transfers the message to the server 42.

Then, referring to step 83, the server 42 reformats the message if necessary and then sends the message to the specified receiving device. For example, if the email client 24s is the sending device and uses a first message format and desktop pager 20r is the receiving device and uses a second message format, the server 42 converts the message from the e-mail client 24s into the second format, and then transfers the reformatted message to the desktop pager 20r.

Next, referring to step 85, when the sending device finishes sending the message, it notifies the routing server 42, which conventionally closes the communication path between itself and the sending device.

Then, referring to step 87, the server 42 conventionally closes the communication path between itself and the receiving device.

Thus, the servers 42 of the networks 40 and 60 of FIGS. 2 and 3, respectively, can facilitate more efficient communication between message-sending and message-receiving devices by automatically selecting the best network communication topology. Also, the servers 42 allow a recipient to redirect a message from one receiving device to another receiving device, and allow a message device of one type to communicate with a message device of another type.

FIGS. 5–8 disclose embodiments of techniques that allow a sender to send a message to the recipient such that the server 42 can route the message according to the recipient's routing preferences. FIGS. 5–8 are discussed in conjunction with the network 40 of FIG. 2, it being understood that the discussion is also applicable to the network 60 of FIG. 3 unless otherwise noted.

Figure 5:
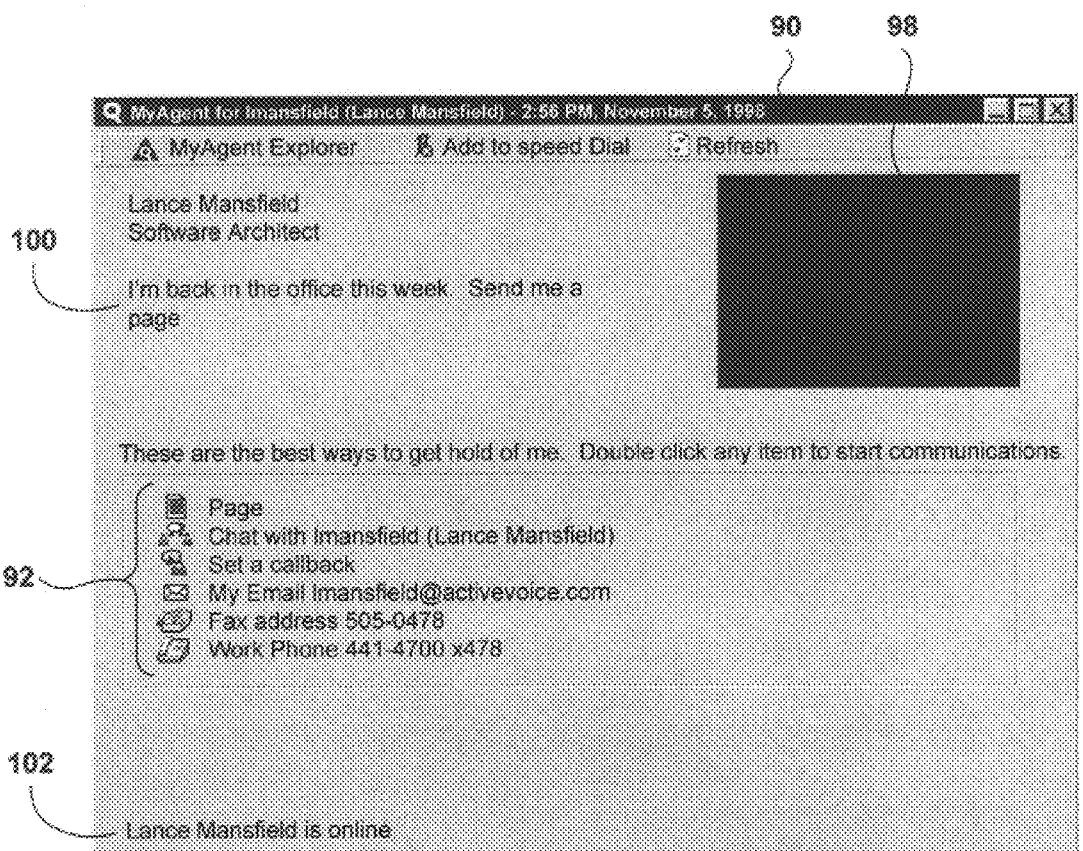
FIG. 5 is a computer screen generated by an embodiment of the message routing clients of FIGS. 2 and 3 for showing a message sender the available message devices of an intended message recipient.

FIG. 5 is a computer screen 90 that allows a sender who is a registered user of the routing server 42 to send messages to a recipient who is also a registered user of the server 42. Using the routing client 48s, the sender creates one or more groups of recipients, and adds the recipient to one of these groups. For example, a sender may have a group for work colleagues and another group for personal friends. The client 48r for each designated recipient prompts the respective recipient for messaging information, receives the information from the recipient, and makes this information available to the sender via the server 42. Based on this information, the routing client 48s generates the screen 90 on the sender's computer 12s.

The screen 90 includes a list field 92, which includes a list of messaging devices that the recipient has made available to receive messages from the sender. In one embodiment, the routing client 48s is run in a Microsoft Windows® environment so that the sender can select the desired messaging device by pointing and clicking with a mouse. For example, if the sender points and clicks on the "Page" icon, then the routing client 48s will prompt the sender to enter a message to the desktop pager 20s, which will send the message to the recipient's desktop pager 20r (or other message device specified by the recipient's routing rules) with the help of the server 42 as discussed above in conjunction with FIG. 4. In one embodiment, some messaging devices such as the desktop pager 20s and a chat device (activated by clicking on the "Chat" icon) actually run as part of the routing client 48s. But the routing client 48s operates in a similar manner for other message devices as well. For example, the field 92 allows the sender to send messages to the recipient's e-mail server 26r, fax, or telephone. In response to the sender's selection of these devices, the routing client 48s respectively activates the sender's e-mail client 24s or modem (not shown) so that the sender can proceed to send the message to the respective receiving devices. Furthermore, although icons are shown for certain messaging devices, the field 92 may include icons for other messaging devices such as but not limited to a wireless pager (e.g. Skytel®) or a personal digital assistant (PDA).

Other features of the screen 90 include an image field 98, which can include the recipient's photo or a live picture, a greeting field 100, which can include the recipient's greeting, and a log-in status field 102, which indicates whether the recipient—or more accurately the computer 12r running the client 48r—is logged onto the server 42. The screen 90 may also include other fields such as a schedule field that includes the recipient's current calendar.

Figure 6:
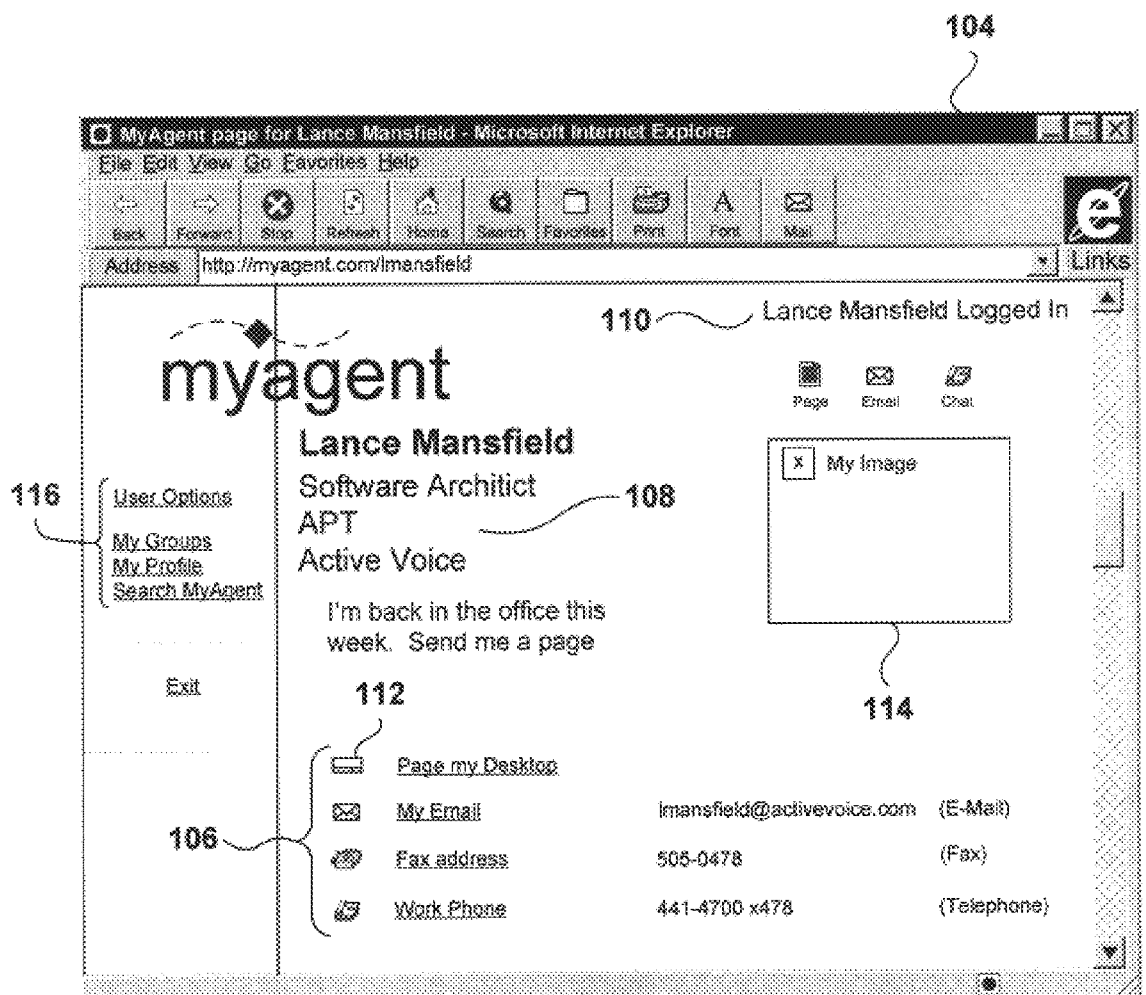
FIG. 6 is a web home page generated by an embodiment of the message routing server of FIGS. 2 and 3 for showing the available message devices of an account holder.
Figure 7:
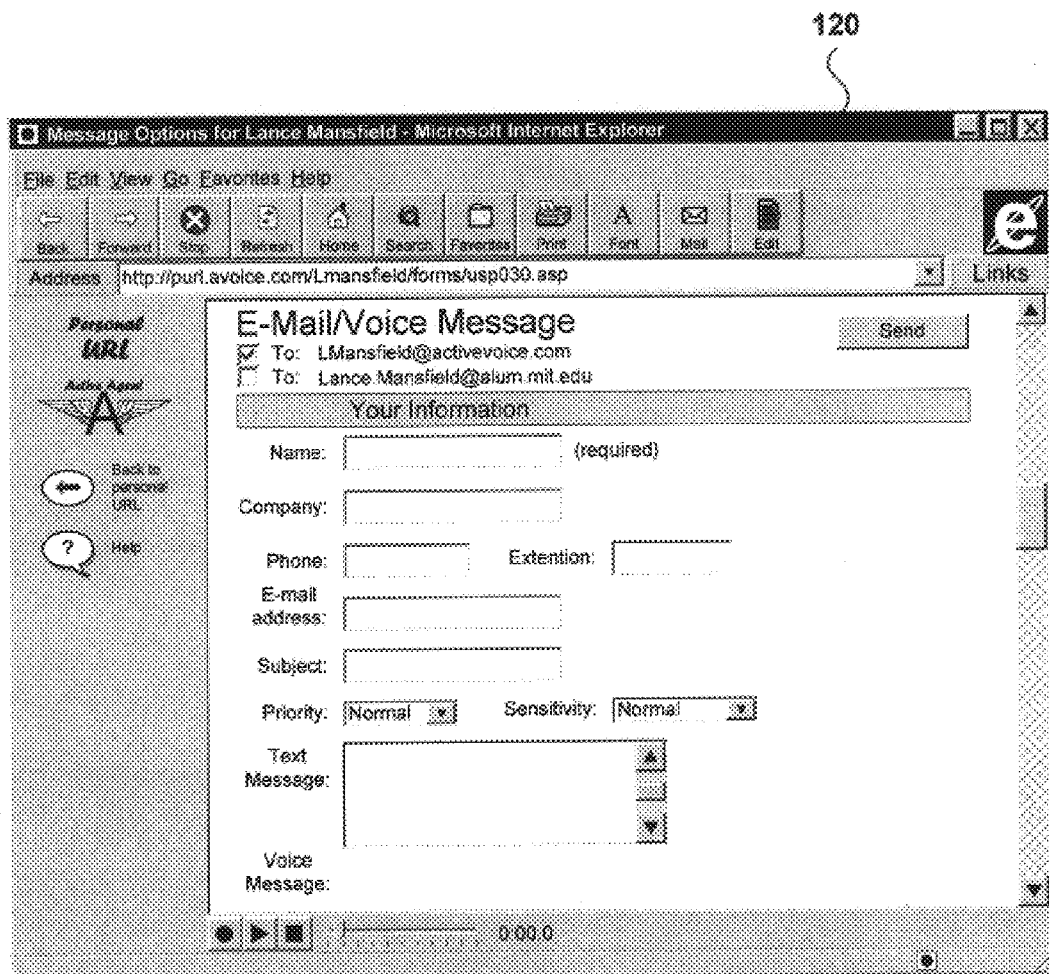
FIG. 7 is a web page generated by an embodiment of the routing servers of FIGS. 2 and 3 for prompting a sender who is not logged onto the server for a message and other related information.

FIGS. 6 and 7 are web pages that allow a sender who is not a registered user of the routing server 42 to send messages via the web browser 22s to a recipient who is a registered user of the server 42.

FIG. 6 is a recipient's home page 104 on the server 42. The sender accesses the home page 104 by using his web browser 22s to access the URL for the home page 104. Like the screen 90 of FIG. 5, the page 104 includes a device field 106, a greeting field 108, a log-in status field 110, and an image field 114, and may include other fields such as a schedule field. Like the screen 90, although icons for certain messaging devices are shown, the device field 106 may include icons for other messaging devices such as but not limited to a wireless pager (e.g. Skytel®) or a personal digital assistant (PDA).

The sender uses the web browser 22s to send a message to a receiving device selected from the field 106, and as discussed above in conjunction with FIG. 4, the server 42 reformats the message if necessary and routes the message to the receiving device specified by the recipient's routing preference. In one embodiment, the page 104 also includes an option field 116. The "My Groups" option allows the sender to view the groups to which the recipient belongs. The "My Profile" option allows the sender to view the recipient's profile, which includes additional information about the recipient. The "Search My Agent" option allows the sender to access the web pages of other registered users of the server 42 without knowing their URLs. This option is also available from the general home page (not shown) of the server 42. A user, however, may instruct the server 42 to prohibit others from accessing his web page through the "Search My Agent" option for security or privacy reasons.

FIG. 7 is a page 120, when the server 42 sends the web browser 22s if the sender clicks on the "My Email" icon on the page 104 of FIG. 6. The screen 120 prompts the sender for information and allows the sender to send an e-mail message to the recipient via the web browser 22s. As discussed above in conjunction with FIG. 4, the server 42 routes this e-mail message to the recipient's e-mail server 26s or to another of the recipient's message devices according to the recipient's routing preferences.

Figure 8:
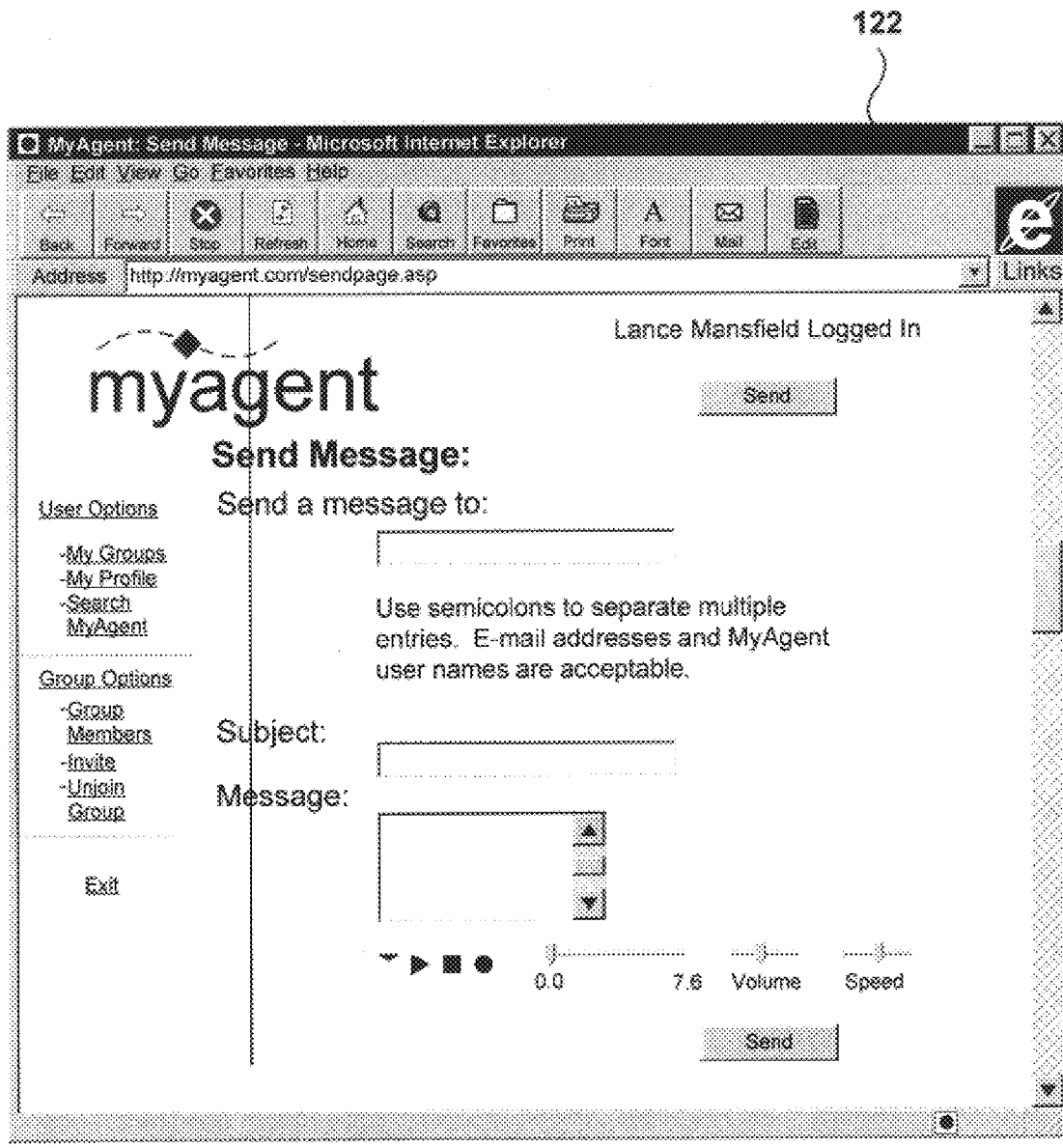
FIG. 8 is a web page generated by an embodiment of the routing servers of FIGS. 2 and 3 for prompting a sender who is logged onto the server for a message and other related information.

FIG. 8 is a screen 122, which allows a registered user of the server 42 to send a message from the user's own web site to a registered or unregistered recipient. The screen 122 prompts the sender for the necessary information, such as the recipient's user name or e-email address. The screen 122 also includes a "Group Options" field, which allows the user to form and join user groups, to invite other registered users to join a group, and to unjoin groups.

Figure 9:
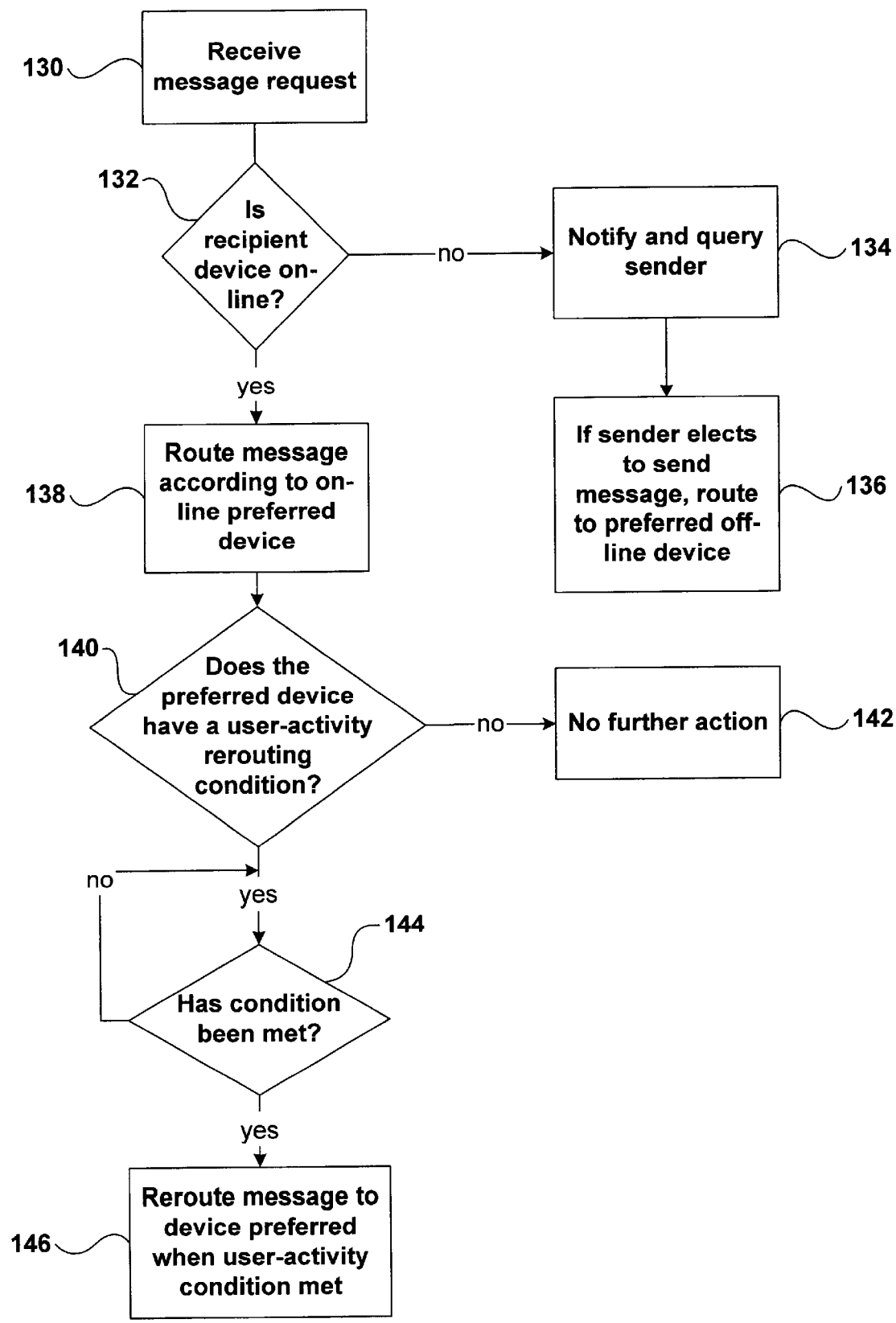
FIG. 9 is a flow chart of a message routing procedure that an embodiment of the routing servers and clients of FIGS. 2 and 3 implement.
Figure 10:
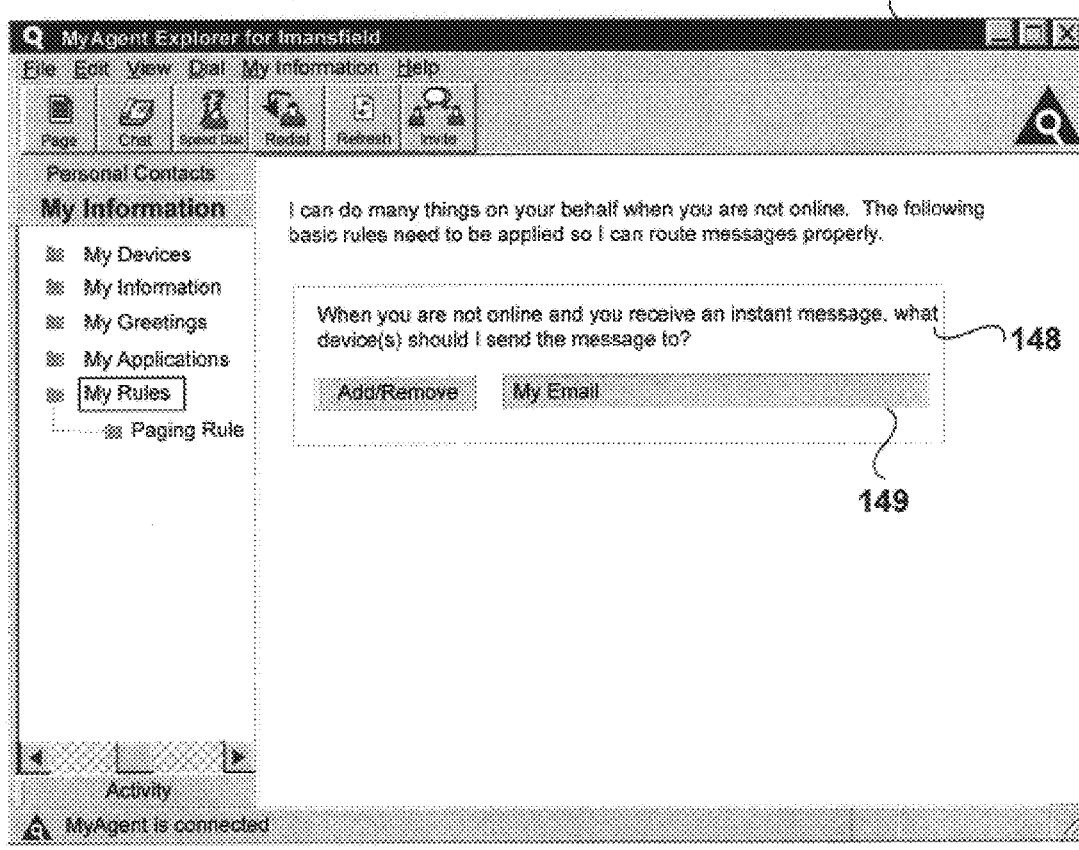
FIG. 10 is a computer screen generated by an embodiment of the routing clients of FIGS. 2 and 3 for prompting a recipient for his off-line routing preferences.
Figure 11:
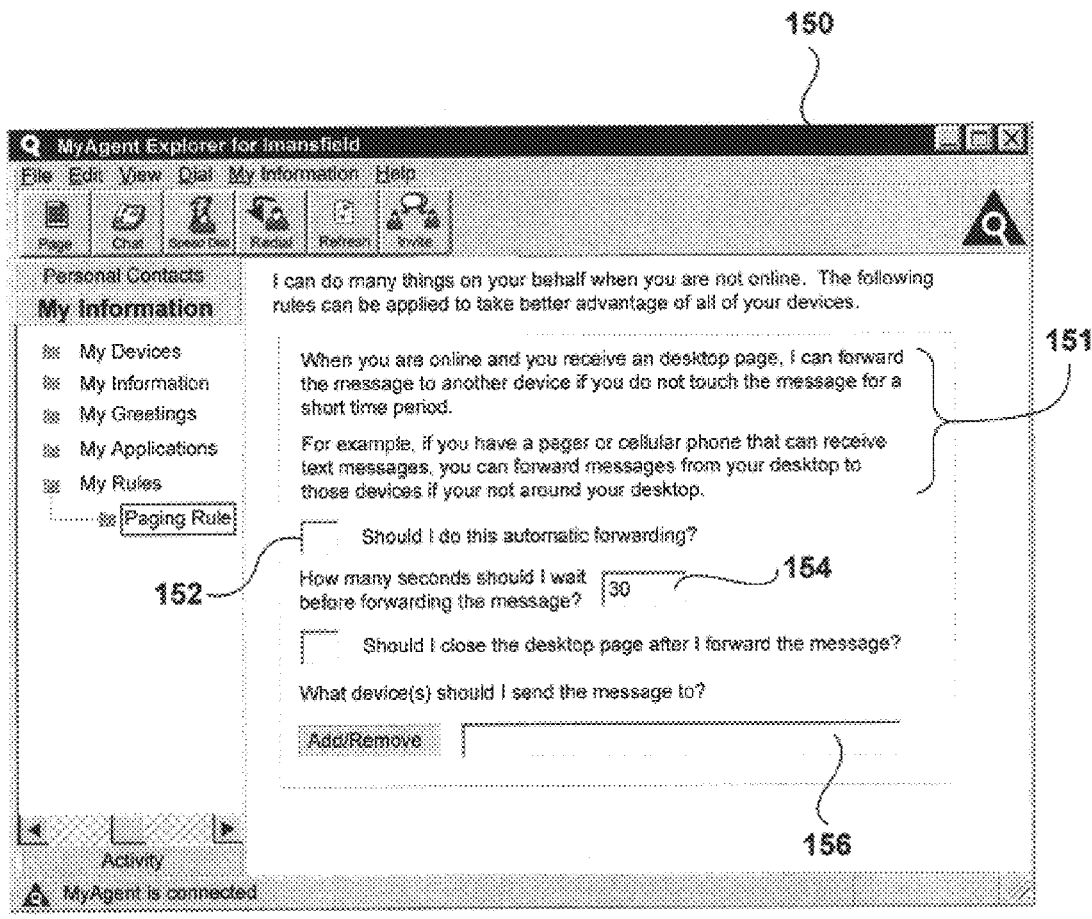
FIG. 11 is a computer screen generated by an embodiment of the routing clients of FIGS. 2 and 3 for prompting a recipient for his on-line-but-unavailable routing preferences.

Referring to FIGS. 9 through 11, embodiments of the techniques for setting a recipient's routing preferences and routing messages according these routing preferences are discussed.

FIG. 9 is a flow chart showing how the server 42 and the receiving client 48r route messages according to an embodiment of the invention. The flow chart of FIG. 9 is similar to the flow chart of FIG. 4, except that it focuses on message routing instead of on the determination of the network topology.

Referring to step 130, the server 42 receives the message-initiation header from the sending device. Next, referring to step 132, the server 42 determines whether or not the recipient's computer 12r, which runs the client 48r, is logged onto the server. If not, the server 42 routes the message according to the recipient's off-line routing preferences. For example, in one embodiment, if the recipient's device to which the sender directed the message is unavailable, then referring to step 134, the server 42 notifies the sender that the intended receiving device is unavailable. The server 42 may give the sender the option of sending the message to the receiving device specified by the off-line routing preferences or of canceling the message. Next, referring to step 136, if the sender elects to send the message, then the server 42 routes the message to the receiving device specified by the recipient's off-line routing preferences. For example, suppose that the sender wants to send a message from the desktop pager 20s to the desktop pager 20r but the computer 12r is not logged onto the server 42 via the client 48r. Furthermore, suppose that the recipient's routing preferences instruct the server 42 to route desktop pages to the e-mail server 26r if the computer 12r is off line. Thus, the server 42 informs the sender that any page he sends will be routed to the recipient's e-mail server 26r and asks the sender if he still wants to send the page or if he wants to cancel and wait until later. If the sender decides to go ahead and send the page, the server 42 will route the page to the email server 26r. In another embodiment, however, the server 42 routes the message to the preferred off-line device without informing the sender.

Referring to step 138, if the computer 12r is logged onto the server 42, then the server 42 routes the message to the receiving device specified by the recipient's online routing preferences. For example, the on-line routing preferences may instruct the server 42 to route a page from the desktop pager 20s to the desktop pager 20r.

Next, referring to step 140, after the server 42 routes the message, the receiving client 48r determines if the specified receiving device has a rerouting condition, such as a user-activity rerouting condition, associated with it. If there is no condition, then referring to step 142, the server 42 and the client 48r take no further action with respect to the message. If there is a rerouting condition, however, then referring to step 144, the client determines if the condition is met. If the condition is met, then referring to step 146, the client causes the server to reroute the message to the device specified by the routing preferences. For example, as discussed below in conjunction with FIG. 11, the routing preferences may specify that if a recipient does not "pick up" a message to the desktop pager 20r within a certain amount of time, then the client 48r is to cause the server 42 to reroute the message to another receiving device such as the e-mail server 26r. Thus, if the recipient does not pick up the page within the allotted time, then the client 48r causes the server 42 to reroute the page to the e-mail server 26r. Referring again to steps 144 and 146, in one embodiment, the client 48r monitors the receiving device to determine if the condition is met. This embodiment is useful when the receiving device, for example the desktop pager 20r, is part of the client 48r. In another embodiment, the receiving device notifies the client when the condition has been met.

FIG. 10 is a screen 147, which is generated by the routing client 48r and which prompts a recipient to enter his off-line routing preferences. Specifically, a prompt 148 prompts the recipient to select the preferred device or devices for receiving a message intended for the desktop pager 20r if the computer 12r is not logged onto the server 42 when the message is sent. In the embodiment shown, the recipient enters the preferred device or devices, here the e-mail server 26r, in a field 149. Thus, if the recipient is out of town and is not running his computer 12r, then the server 42 will forward all desktop pages to his e-mail server 26r. If the recipient has remote access to his e-mail server 26r, then he can access these desktop pages before he returns from his trip.

FIG. 11 is a screen 150, which is generated by the routing client 48r and which prompts the recipient to enter a rerouting condition. Specifically, a prompt 151 prompts the recipient to check a box 152 if he would like the server 42 to reroute desktop pages if the recipient does not pick up the message within a time period specified in a box 154. The device to which the page will be rerouted is specified in a box 156.

The server 42 or the client 48r can determine if the recipient has picked up the desktop page from the desktop pager 20r in a number of ways. In one embodiment, the client 48r or the server 42 monitors the input device 13r to determine if it has provided any data to the computer 12r within the time period specified in the box 154. The idea is that if the input device 13r provides data during the specified time period, then the recipient was sitting at the computer 12r during this period and thus has read the desktop page. Conversely, if the input device 13r has not provided data, then the recipient was not sitting at the computer 12r during the specified period and thus has not read the desktop page. The input device 13r may be any conventional input device such as a keyboard or mouse. Alternatively, the device 13r may be a device such as a video camera or a microphone that the server 42 or client 48r monitors for movement or sound, respectively.

Figure 12:
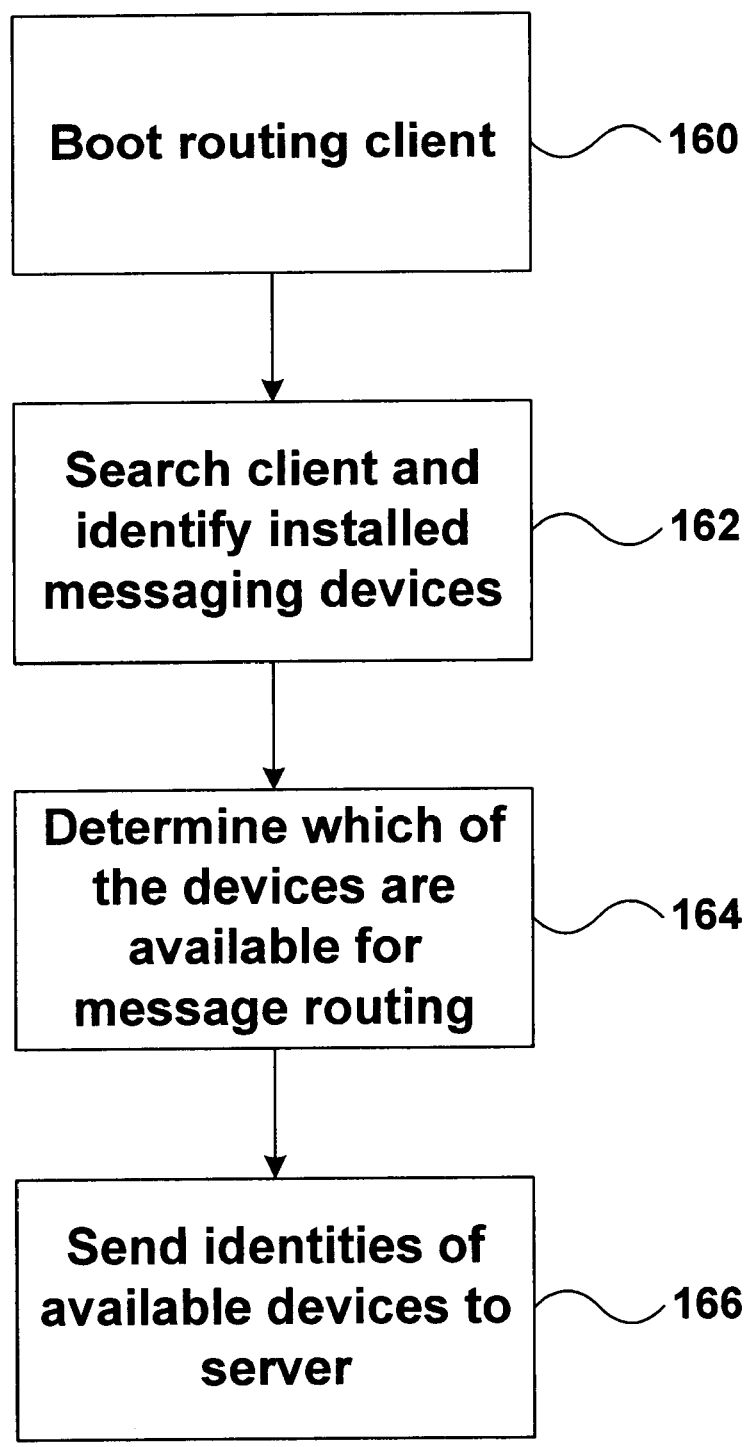
FIG. 12 is a flow chart of a procedure implemented by an embodiment of the routing clients of FIGS. 2 and 3 for finding all of the message devices installed on the computers that respectively run the routing clients.

FIG. 12 is a flow chart of an automatic-message-device-recognition procedure implemented by one embodiment of the routing client 48r.

First, referring to the step 160, the recipient boots the routing client 48. The recipient may do this by a special command after the computer 12r has booted up, or the client 48r may boot automatically during the boot sequence of the computer 12r.

Next, referring to step 162, the booted client 48r searches the storage area 16r of the computer 12r for message devices that are installed on the computer 12r such as the desktop pager 20r, the web browser 22s, and the e-mail viewer 24s.

Then, referring to step 164, the routing client 48r determines which of these installed message devices the recipient wants to make available to senders. In one embodiment, these available message devices are included in the device fields 92 and 106 as discussed above in conjunction with FIGS. 5 and 6, respectively. More specifically, on its first boot, the client 48r includes all such devices in the fields 92 and 106. The recipient, however, can remove one or more of these devices from the fields 92 and 106. On subsequent boots, the client 48r will omit from the fields 92 and 106 any message devices previously removed therefrom, unless the recipient subsequently adds these devices back to the fields 92 and 106.

Next, referring to the step 166, the booted client 48 sends to the server 42 the identities, addresses, and other information for the message devices that are listed in the fields 92 and 106, and also sends the server 42 the recipient's routing preferences as discussed above.

Therefore, the recipient does not have to perform a tedious installation of the message devices into the client 48r or the server 42. Furthermore, the client 48r may even identify and list message devices that the recipient didn't even know were installed on the computer 12r!.

Figure 13:
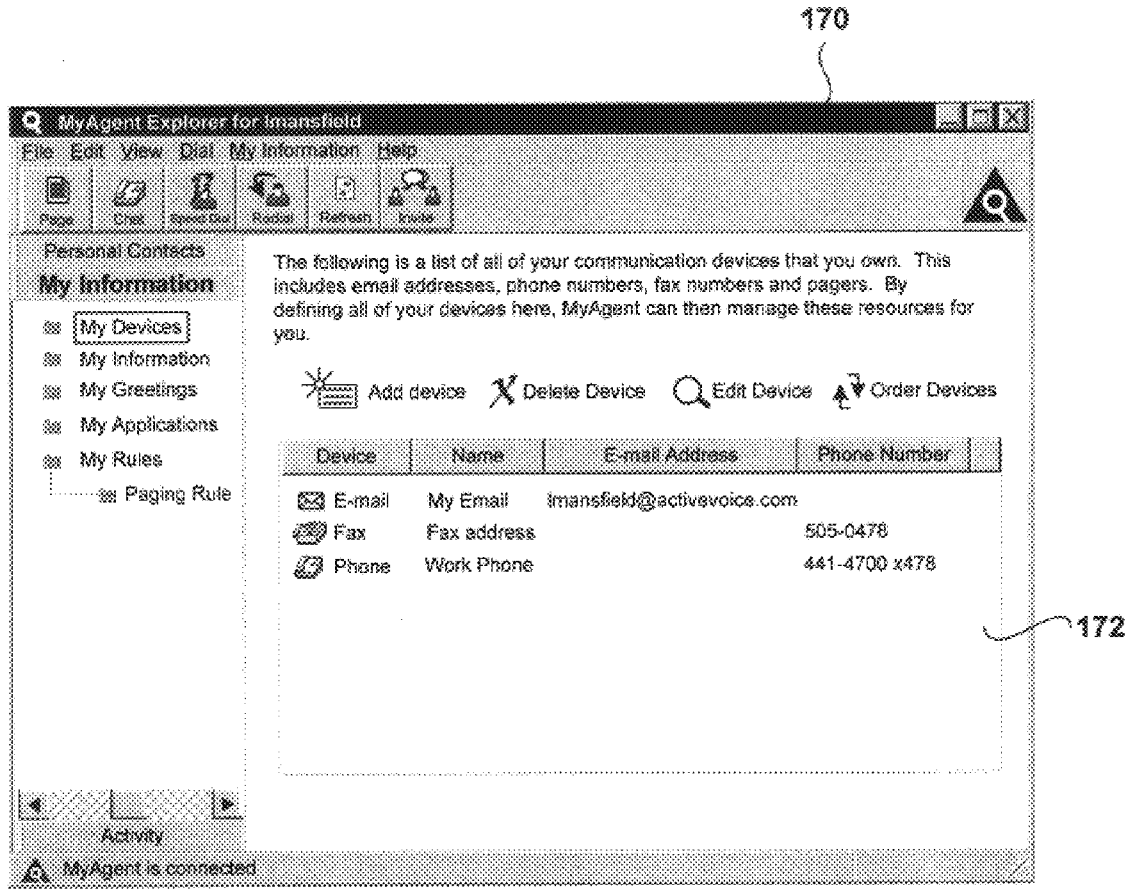
FIG. 13 is a device-listing screen generated by the embodiment of the routing clients that implement the procedure of FIG. 12.

FIG. 13 is a display screen 170, which one embodiment of the client 48r generates according to the flow chart of FIG. 12 to allow a recipient to remove and add message devices that are available to senders. The available devices are listed in a field 172, and can be deleted or added by clicking on the "Delete Device" and "Add Device" icons, respectively. When the "Add Device" icon is selected, the client 48r lists for the recipient's selection all message devices installed on the computer 12r but not currently available to senders, i.e., not listed in the fields 92 or 106.

Figure 14:
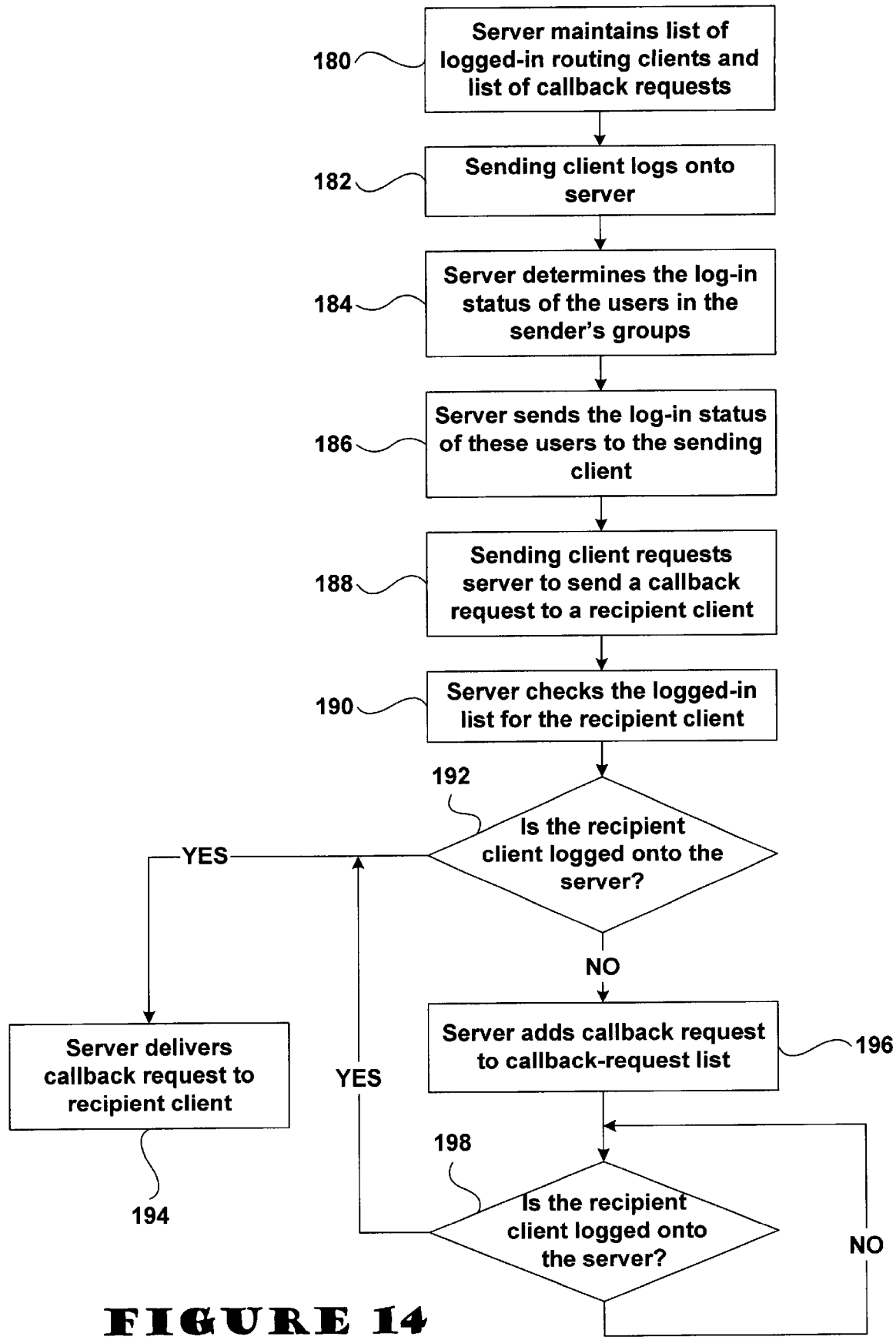
FIG. 14 is flow chart of a call-back procedure implemented by an embodiment of the servers and clients of FIGS. 2 and 3.

FIG. 14 is a flow chart of a callback procedure executed by the server 42 and the routing client 48s according to an embodiment of the invention.

Referring to step 180, the server 42 maintains a list of the users that are currently logged onto the server 42 via their respective clients 48, and also maintains a list of undelivered callback requests.

Next, referring to steps 182, 184 and 186, in one embodiment, the server 42 provides to a sender the log-on status of the recipients in the sender's groups, such as provided in the field 102 of the screen 90 in FIG. 5. More specifically, referring to step 182, the sender logs onto the server 42 via the computer 12s and the client 48s. Next, referring to step 184, the server 42 determines the log-on status of each user in the sender's groups by checking the logged-on list. In one embodiment, the server 42 stores the membership data for the sender's groups so that the client 48s need not send this data to the server every time the sender logs onto the server. Then, referring to step 186, the server 42 sends the log-on status of each of these users to the sending client 48s. In one embodiment, the sending client 48s can also request the log-on status of a user even after the sending client 48s has logged onto the server 42.

Next, referring to step 188, the sender requests a callback. That is, the sender requests the server 42 to deliver a callback request to the client 48r of a recipient. The callback request notifies the recipient that the sender wishes to contact him/her. For example, in one embodiment, referring to the field 92 in the screen 90 of FIG. 5, the sender can request a callback by clicking on the "Set A Callback" icon.

Then, referring to steps 190 and 192, the server 42 checks the logged-on list and determines whether the recipient is logged onto the server.

Next, referring to step 194, if the recipient is logged on, then the server delivers the callback request to the recipient's client 48r.

But, referring to step 196, if the recipient is not logged on, then the server adds the callback request to the callback list. Referring to step 198, when the recipient logs on, the server 42 checks the callback list to determine if the recipient has any outstanding callback requests. If, as in this example, the recipient does have an outstanding callback request, then the server 42 delivers the callback request to the recipient's client 48r.

Thus, the callback procedure eliminates the problems associated with conventional polling as discussed above in conjunction with FIG. 1.

Figure 15:
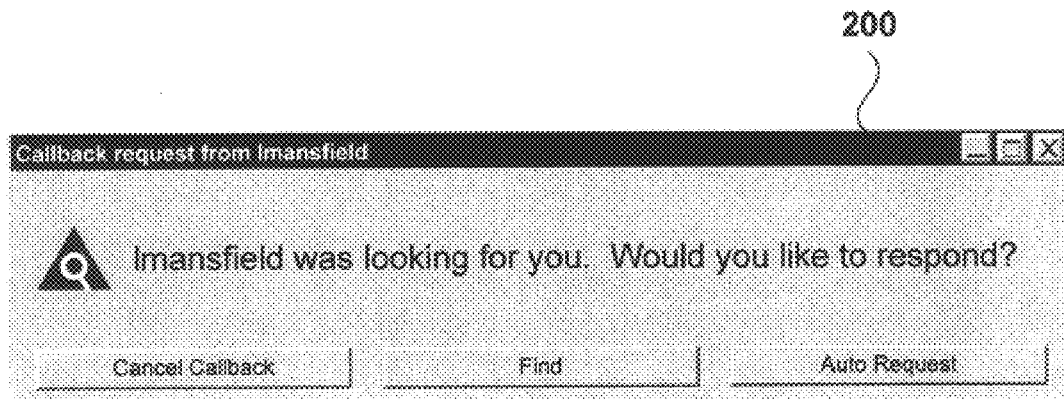
FIG. 15 is a call-back-notification screen generated by the embodiment of the routing clients that implement the client portion of the call-back procedure of FIG. 14.

Referring to FIG. 15, in one embodiment of the callback procedure described in the flow chart of FIG. 14, the client 48r generates a screen 200 in response to the callback request delivered by the server 42. The screen 200 identifies the sender and allows the recipient, via the client 48r, to either allow or cancel the callback. That is, the recipient has the option of allowing the server 42 to notify the sender that the recipient is now available or of preventing the server 42 from doing so. Thus, the recipient can cancel the callback request if he/she does not want to be bothered by the sender.

Figure 16:
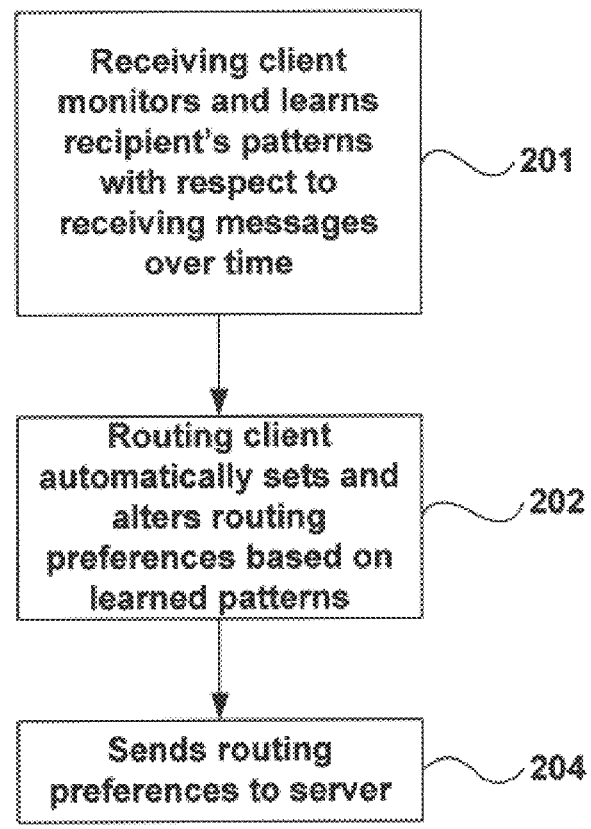
FIG. 16 is a flow chart of procedure implemented by an embodiment of the routing clients of FIGS. 2 and 3 for learning a recipient's messaging patterns and generating a routing preference based on these patterns.

FIG. 16 is a flow chart of a message-routing learning procedure implemented by one embodiment of the routing client 48r. Implementing this procedure allows the client 48r to automatically suggest, generate, or maintain the recipient's routing preferences.

Referring to step 201, the client 48r periodically or continually monitors the recipient's actions with respect to his received messages. Next, referring to step 202, the client 48r automatically suggests changes to, sets, or updates the routing preferences based on patterns that the client 48r has detected with respect to the received messages and the recipient's related actions. Then, referring to step 204, the client 48r sends these new routing preferences to the server 42 (with the recipient's permission if the client 48r has only suggested new routing preferences).

Still referring to steps 201, 202, and 204, in one embodiment, the client 48r implements a statistical correlation matrix, such as a conventional Baysian network, to correlate message characteristics (e.g., sender's identity, time of day message received) with the recipient's actions (e.g., forward or ignore message) for a group of messages such as the last one thousand received messages.

For example, suppose that using this technique, the client 48r determines that out of fifty phone calls to the recipient's work phone on weekends and after 5:00 p.m. on weekdays, the recipient has answered two, and the rest have been routed to the recipient's voicemail server 30r. (In one embodiment, the client 48r can determine whether a call is answered or sent to voice mail by communicating with the voicemail server 30r using conventional techniques.) Therefore, in response to this pattern, the client 48r may suggest that the recipient adopt a routing preference that causes the server 42 to route all work phone calls received on weekends and after 5:00 p.m. and on weekdays directly to the voicemail server 30r, and thus reduce the chances that the caller will be aggravated by the phone ringing a number of times before he is transferred to voicemail.

Or, suppose that the client 48r determines that out of twenty five e-mail messages from a particular sender when the e-mail client 24r also displays unread e-mail messages from other senders, the recipient has opened this particular sender's messages first twenty four times. (In one embodiment, the client 48r can determine the order in which unread e-mail messages are opened by communicating with the e-mail client 24r or e-mail server 26r using conventional techniques.) In response to this pattern, the client 48r may suggest that the recipient adopt a routing preference that causes the server 42 to route all e-mails from this particular sender with high priority or in another manner such that they are always at the top of the unread e-mail list when the e-mail client 24r displays unread e-mail messages.

Figure 17:
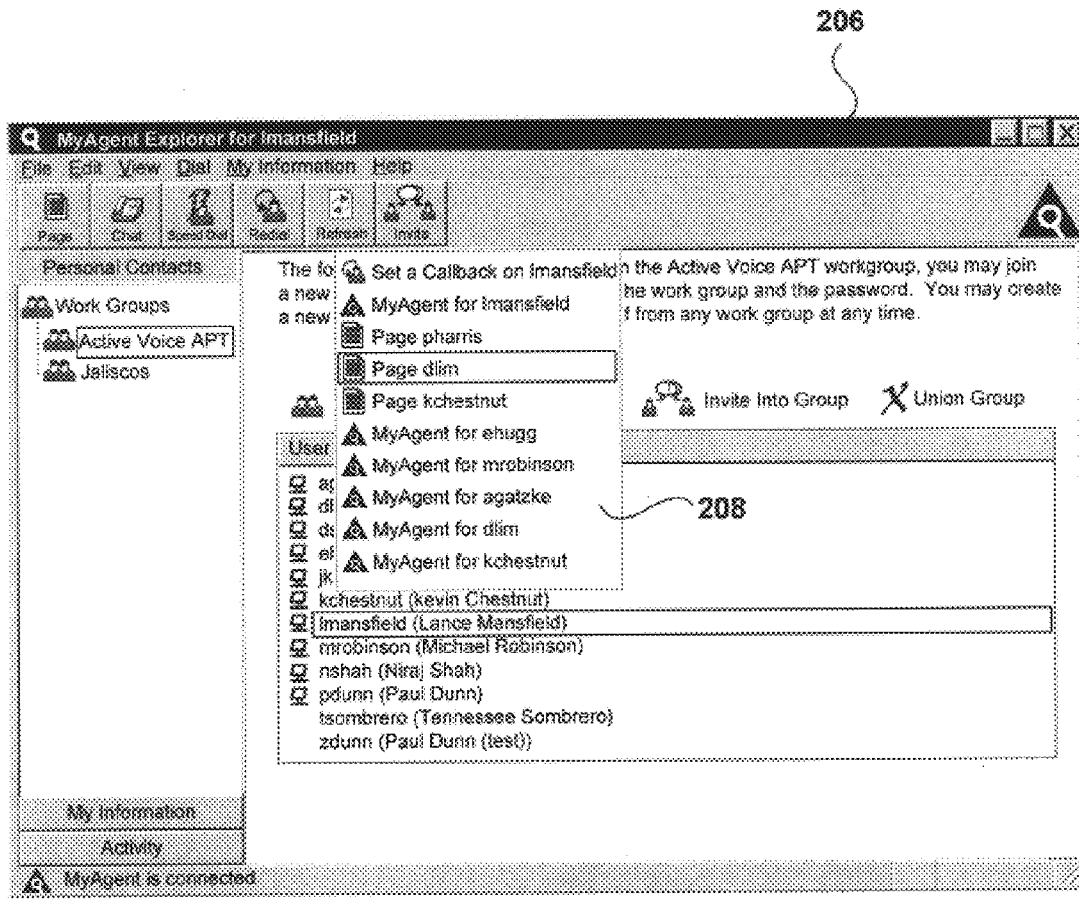
FIG. 17 is a redial screen generated by the embodiment of the routing clients that implement the procedure of FIG. 16.

FIG. 17 is a screen 206 and a redial list 208 generated by one embodiment of the routing client 48s according to a procedure similar to that discussed above in conjunction with FIG. 16. Unlike the FIG. 16 procedure, however, this procedure learns a sender's message-sending patterns. More specifically, the client 48s keeps track of the most popular message-sending actions that the sender has taken. In this embodiment, the client 48s retains ten actions, and updates the list 208 to include the last action taken. But when the client 48s updates the list 208 with the most recent action, it removes the least popular action on the list 208 and not necessarily the least recent action taken. Thus, the list 208 is not merely a list of the last ten actions taken, but is a combination of the last actions taken and the actions that the sender takes most frequently. For example, the list 208 may include the last five actions taken, and five of the most frequently taken actions.

Figure 18:
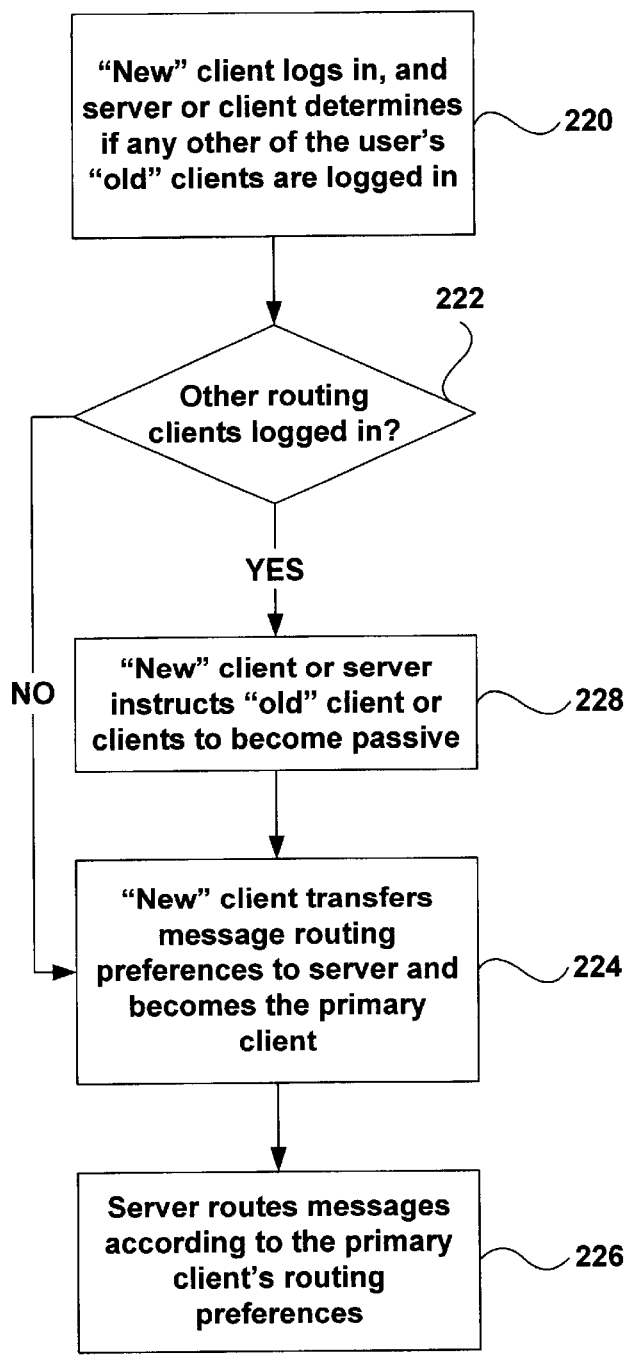
FIG. 18 is a flow chart of a procedure implemented by one embodiment of the servers or clients of FIGS. 2 and 3 for setting client priority at log in if multiple clients of the same user are logged onto the server.
Figure 19:
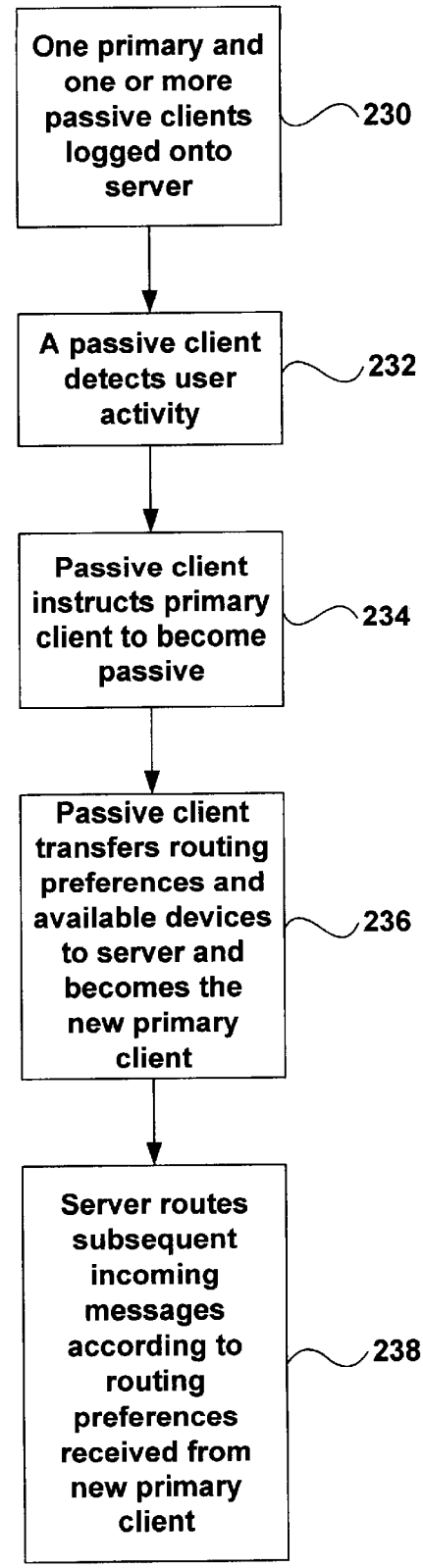
FIG. 19 is a flow chart of a procedure implemented by one embodiment of the servers or clients of FIGS. 2 and 3 for setting client priority based on user activity if multiple clients of the same user are logged on to the server.

FIGS. 18 and 19 are flow charts showing embodiments of respective procedures that allow a user to have multiple routing clients 48 simultaneously logged onto the server 42. For example purposes, referring to FIG. 2, assume that the recipient owns the computers 12s (work) and 12r (home) and runs the routing clients 48s and 48r simultaneously. As discussed above, the labels of sending and receiving for the clients 48s and 48r are arbitrary as these clients can perform both message-sending and message-receiving functions. Therefore, this is an accurate example.

The flow chart of FIG. 18 is an embodiment of a procedure to designate a newly logged-on client 48 as the primary client and the other client or clients that are already logged on as passive clients. The significance of the primary client 48 is that the server 42 follows the routing preferences of the primary client. For example purposes, the client 48s is the newly logged-on client, and the client 48r is already logged on to the server 42 at the time the client 48s logs on. It is understood, however, that in some embodiments there may be more than one client 48 already logged onto the server 42.

More specifically, referring to step 220, the "new" client 48s logs onto the server 42 via the computer 12s and determines whether or not the client 48r is logged onto the server 42. The new client 48s may make this determination in a variety of ways. In one embodiment, the server 42 automatically provides the new client 48s with the log-in status of the client 48r in a manner similar to that discussed above in conjunction with FIG. 14. In another embodiment, the new client 48s requests the log-in status of the client 48r from the server 42 also in a manner similar to that discussed above in conjunction with FIG. 14.

Next, referring to step 222, if the client 48r is not logged onto the server 42, then, referring to step 224, the new client 48s transfers its message-routing preferences to the server 42, and referring to step 226, the server 42 proceeds to route messages according to these routing preferences as discussed above in conjunction with FIG. 4.

On the other hand, if the client 48r is logged onto the server, then the client 48s instructs the client 48r to become passive. The client 48s may provide these instructions to the client 48r in a number of ways. In one embodiment, the new client 48s requests the server 42 to set up a PTP communication path between it and the client 48r as discussed above in conjunction with FIG. 4. In other embodiments, the new client 48r requests a communication path to the client 48r through the server 42 (star topology) also as discussed above in conjunction with FIG. 4, or the server 42 instructs the client 48r to become passive.

Referring again to steps 224 and 226, after the client 48r is instructed to become passive, then the new client 48s transfers its routing preferences to the server 42, which routes messages according to these preferences.

The flow chart of FIG. 19 shows an embodiment of a procedure to select a new primary client among multiple clients that are all already logged onto the server 42.

Referring to step 230, multiple clients 48 are logged onto the server 42, and one of these clients is the primary client and the others are passive clients. For example purposes, suppose that the user went home from work and left his work client 48s running. Then suppose he logs the home client 48r onto the server 42, and according to the procedure described in conjunction with FIG. 18, the client 48r becomes the primary client and the client 48s becomes the passive client.

Referring to step 232 and using the above example, the passive client 48s detects a condition, such as user activity, that indicates it should now be the primary client. For example, this situation occurs if the user goes back to work without logging off the client 48r and starts using the computer 12s. The theory here is that the user wants the client on the computer he is using, here the client 48s, to be the primary client so that his messages are routed accordingly. In one embodiment, the client 48s detects the user activity by monitoring the input device 13s as discussed above in conjunction with FIG. 9.

Next, referring to step 234, the passive client 48s instructs the primary client 48r to become passive. In one embodiment, the passive client 48s communicates with the client 48r as discussed above in conjunction with FIG. 18.

Then, referring to the step 236, the passive client 48s transfers its message routing preferences and other information to the server 42 and becomes the new primary client.

Referring to step 238, the server 42 then routes subsequent incoming messages according to the routing preferences provided by the new primary client 48s.

From the foregoing it will be appreciated that, although specific embodiments of the invention have been described herein for purposes of illustration, various modifications may be made without deviating from the spirit and scope of the invention.

What is claimed:

1. A system for providing unified communications between a message sending device that sends a message to a user and a plurality of message devices associated with the user, each message device having an associated device identifier, the system comprising:
   a messaging client computer having at least one associated message device;
   a messaging client program operable on the client computer that dynamically detects a state of at least one of the associated message devices;
   a messaging server computer in communication the messaging client computer;
   a profile database having message routing preferences associated with the user, the profile database accessible to the messaging server computer for electronic communication; and
   a server program operable on the messaging server that determines zero or more message devices to which the message to the user should be sent based upon the message routing preferences retrieved via the profile database and the state of at least one message device associated with the user.

2. The system of claim 1, wherein the state of a message device indicates that the message device is in active use by the user.

3. The system of claim 2, wherein the messaging server program determines the message device to which the message to the user should be sent by at least in part determining that the state of the message device indicates that the message device is in active use by the user.

4. The system of claim 3, wherein the system monitors the usage patterns of the user and automatically updates the message routing preferences to reflect the usage patterns of the user.

5. The system of claim 4, wherein determining the usage patterns of the user comprise detecting an order in which the user acts on each message received.

6. The system of claim 5, wherein determining the usage patterns of the user comprise further comprise correlating the order in which the user acts on each message to the user received with characteristics of the message to the user.

7. The system of claim 4, wherein the system prompts the user for the authority to automatically update the message routing preferences that are based on suggestions automatically generated from the monitored usage patterns of the user.

8. The system of claim 4, wherein determining the usage patterns of the user comprise correlating characteristics of the message to the user with the user's actions pertaining to the message when received at the message device to which the message to the user was directed.

9. The system of claim 2, wherein the messaging client program detects that the message device is in active use by the user by at least in part detecting a log-on of the message device within a pre-defined interval preceding the detection.

10. The system of claim 9, wherein the messaging server program determines the message device to which the message to the user should be sent by at least in part determining that the state of the message device indicates that the message device is in active use by the user.

11. The system of claim 2, wherein the messaging client program detects that the message device is in active use by the user by at least in part detecting input/output activity involving the message device within a pre-defined interval preceding the detection.

12. The system of claim 11, wherein the messaging server program determines the message device to which the message to the user should be sent by at least in part determining that the state of the message device indicates that the message device is in active use by the user.

13. The system of claim 2, wherein the messaging client program detects that the message device is in active use by the user by at least in part detecting changes in video input from a video camera in proximity to the message device within a pre-defined interval preceding the detection.

14. The system of claim 13, wherein the messaging server program determines the message device to which the message to the user should be sent by at least in part determining that the state of the message device indicates that the message device is in active use by the user.

15. The system of claim 2, wherein the messaging client program detects that the message device is in active use by the user by at least in part detecting changes in audio input from a microphone in proximity to the message device within a pre-defined interval preceding the detection.

16. The system of claim 15, wherein the messaging server program determines the message device to which the message to the user should be sent by at least in part determining that the state of the message device indicates that the message device is in active use by the user.

17. The system of claim 1, wherein the state of a message device indicates the availability of the message device for electronic communication.

18. The system of claim 17, wherein the messaging server computer maintains a list in active memory of each message device available for electronic communication.

19. The system of claim 18, wherein the messaging server program determining the prioritization of the routing preferences of the user comprises determining the most recent log-on of one of the message devices associated with the user.

20. The system of claim 18, wherein the messaging server computer holds the message to the user for delivery until it determines that the message device to which the message to the user is directed is available by monitoring the list in active memory of each message device available for electronic communication.

21. The system of claim 1, wherein the system monitors the usage patterns of the user and automatically updates the message routing preferences to reflect the usage patterns of the user.

22. The system of claim 21, wherein determining the usage patterns of the user comprise detecting the order in which the user acts on each message received.

23. The system of claim 22, wherein determining the usage patterns of the user further comprise correlating the order in which the user acts on each message to the user received with characteristics of the message to the user.

24. The system of claim 21, wherein the system prompts the user for the authority to automatically update the message routing preferences that are based on suggestions automatically generated from the monitored usage patterns of the user.

25. The system of claim 21, wherein determining the usage patterns of the user comprise correlating characteristics of the message to the user with the user's actions pertaining to the message when received at the message device to which the message to the user was directed.

26. The system of claim 1, wherein there are a plurality of messaging client computers each having at least one associated message device, the plurality of messaging client computers being accessible to the messaging server computer for electronic communication.

27. The system of claim 26, wherein several of the messaging client computers are associated with message devices associated with the user and the routing preferences of the user that are applied by the server program are prioritized by the state of at least one message device associated with the user.

28. The system of claim 27, wherein the messaging server program determining the prioritization of the routing preferences of the user is based at least in part on the state of the message device indicating that the message device is in active use by the user.

* * * * *